US008473741B2

(12) United States Patent
Kerschbaum

(10) Patent No.: US 8,473,741 B2
(45) Date of Patent: Jun. 25, 2013

(54) SYSTEM AND METHOD FOR COMPARING PRIVATE DATA

(75) Inventor: Florian Kerschbaum, Karlsruhe (DE)

(73) Assignee: SAP AG, Walldorf (DE)

(*) Notice: Subject to any disclaimer, the term of this patent is extended or adjusted under 35 U.S.C. 154(b) by 437 days.

(21) Appl. No.: 12/772,302

(22) Filed: May 3, 2010

(65) Prior Publication Data

US 2011/0271107 A1 Nov. 3, 2011

(51) Int. Cl.
*H04L 29/06* (2006.01)

(52) U.S. Cl.
USPC ........... 713/168; 713/163; 713/169; 713/180; 380/28; 380/30; 380/47; 380/255; 380/283; 708/422; 705/50

(58) Field of Classification Search
USPC ....................................................... 713/168
See application file for complete search history.

(56) References Cited

U.S. PATENT DOCUMENTS 6,772,339 B1 * 8/2004 Jakobsson et al. ............ 713/168

FOREIGN PATENT DOCUMENTS

EP 1804416 A1 * 7/2007
EP 1804416 B1 4/2010

OTHER PUBLICATIONS

Zhu, Huafei and Feng Bao. "A Novel Construction of Two-Party Private Bidding Protocol from Yao's Millionaires Problem." Department of Information Security, Institute for Information Research, A-Star. S. Katsikas, J. Lopez, G. Pernul (Eds.): TrustBus 2005, LNCS 3592, pp. 266-273 (2005).*

Kaghazgaran, Parisa, and Babak Sadeghyan. "Secure two party comparison over encrypted data." World Congress on Information and Communication Technologies (WICT), 2011: pp. 1123-1126.*
Huafei Zhu et al., "A Novel Construction of Two-Party Private Bidding Protocols from Yao's Millionaires Problem," Trust, Privacy, and Security in Digital Business, Lecture Notes in Computer Science, vol. 3592/2005, Jan. 1, 2005, pp. 266-273.
Florian Kerschbaum et al., "Performance Comparison of Secure Comparison Protocols," Database and Expert Systems Application, 2009, DEXA '09, 20th International Workshop on Aug. 31-Sep. 4, 2009, pp. 133-136.
Anonymous, "Secure Supply Chain Management—WP3 Protocol Development—D3.2 Protocol Description V2," secureSCM, Jan. 1, 2010, pp. 68-91.
Vladimir Kolesnikov et al., "Improved Garbled Circuit Building Blocks and Applications to Auctions and Computing Minima," Proceedings of the 8th International Conference on Cryptology and Network Security, Cans'09, Dec. 12, 2009, pp. 1-20.
European Search Report for Application No. 11 003 376.8 dated Aug. 8, 2011, 10 pages.

(Continued)

*Primary Examiner* — Taghi Arani
*Assistant Examiner* — Narciso Victoria
(74) *Attorney, Agent, or Firm* — Fish & Richardson P.C.

(57) ABSTRACT

The present disclosure is directed to systems and methods including accessing a first private value, generating a first intermediate value based on the first private value, receiving a second intermediate value that is based on a second private value, generating a first comparison value based on the second intermediate value, receiving over the network a second comparison value that is based on the first intermediate value, comparing the first comparison value and the second comparison value to generate a result, and displaying the result, the result indicating that the first private is greater than the second private value when the first comparison value is less than the second comparison value, and the result indicating that the first private value is less than or equal to the second private value when the first comparison value is greater than the second comparison value.

16 Claims, 4 Drawing Sheets

OTHER PUBLICATIONS

Marc Fischlin, "A Cost-Effective Pay-Per-Multiplication Comparison Method for Millionaires," Proceedings of the 2001 Conference on Topics in Cryptology: The Cryptographer's Track at RSA, p. 457-472, Apr. 8-12, 2001.

Andrew C. Yao, "Protocols for Secure Computations," Proceedings of the 23rd Annual Symposium on Foundations of Computer Science, p. 160-164, Nov. 3-5, 1982.

* cited by examiner

SYSTEM AND METHOD FOR COMPARING PRIVATE DATA

BACKGROUND

Private data includes data that an owner does not want to share with another party. Private data can include, for example, legally protected and/or personal data. As one example, private data can include an amount of money that a party is willing to pay to acquire an object. As a counter-example, private data can include a demanded amount of money, for which a person is willing to sell the object.

In some cases, two party's may wish to compare private data, without divulging the amount of value of the private data. Such a case is described as Yao's millionaires problem, which involves a comparison of private data. Yao's millionaire's problem includes two millionaires that would like to the amount of money that each one has without revealing the amount of money to each other. Although many solutions have been presented to resolve this problem, these solutions require significant computational efforts.

SUMMARY

Implementations of the present disclosure include methods for comparing a first value associated with a first party, and a second value associated with a second party. In some implementations, a method includes accessing the first private value from a computer-readable storage medium, generating a first intermediate value based on the first private value, receiving, at a computing system associated with the first party, from a further computing system associated with the second party over a network, a second intermediate value that is based on the second private value, generating a first comparison value based on the second intermediate value, receiving over the network a second comparison value that is based on the first intermediate value, comparing the first comparison value and the second comparison value to generate a result, and displaying the result on a display of a computing device, the result indicating that the first private is greater than the second private value when the first comparison value is less than the second comparison value, and the result indicating that the first private value is less than or equal to the second private value when the first comparison value is greater than the second comparison value.

In some implementations, generating the first intermediate value includes encoding the first private value to provide a first encoded value, the first encoded value having a predetermined bit-length (k), determining a first random value and a second random value, and calculating the first intermediate value as a function of the first encoded value, the first random value and the second random value. In some implementations, the first random value is determined such that the first random value has a bit-length that is equal to 2k, and the second random value is determined such that the second random value is greater than or equal to zero and has a maximum bit-length of 2k−2. In some implementations, the first comparison value is determined further based on the first random value. In some implementations, at least one of the first and second random values is selected from a plurality of pre-calculated random values.

In some implementations, the second intermediate value is generated by encoding the second private value to provide a second encoded value, the second encoded value having a predetermined bit-length (k), determining a first random value and a second random value, and calculating the second intermediate value as a function of the second encoded value, the first random value and the second random value. In some implementations, the first random value is determined such that the first random value has a bit-length that is equal to 2k, and the second random value is determined such that the second random value is greater than or equal to zero and has a maximum bit-length of 2k−2. In some implementations, the second comparison value is determined further based on the first random value. In some implementations, at least one of the first and second random values is selected from a plurality of pre-calculated random values.

In some implementations, generating the first comparison value includes determining a first random value and a second random value, and calculating the first comparison value as a function of the second intermediate value, the first random value and the second random value. In some implementations, the first random value is determined such that the first random value has a bit-length that is equal to 2k, where k is a predetermined bit-length, and the second random value is determined such that the second random value is greater than or equal to zero and has a maximum bit-length of 4k−1. In some implementations, the first intermediate value is determined further based on the first random value.

In some implementations, the second comparison value is generated by determining a first random value and a second random value, and calculating the second comparison value as a function of the first intermediate value, the first random value and the second random value. In some implementations, the first random value is determined such that the first random value has a bit-length that is equal to 2k, where k is a predetermined bit-length, and the second random value is determined such that the second random value is greater than or equal to zero and has a maximum bit-length of 4k−1. In some implementations, the second intermediate value is determined further based on the first random value.

In some implementations, the method further includes sending the first intermediate value to the computing system associated with the second party over the network.

In some implementations, the method further includes sending the first comparison value to the computing system associated with the second party over the network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to comparing private values of respective parties. In general, the parties would like to compare the private values without revealing the private values to the other party. Both parties contribute to the comparison, and are aware of the result of the comparison. As discussed in further detail herein, implementations of the present disclosure significantly increase the efficiency and reduce the computing time required in effecting the comparison, while maintaining the security and confidentiality of the private values.

Figure 1:
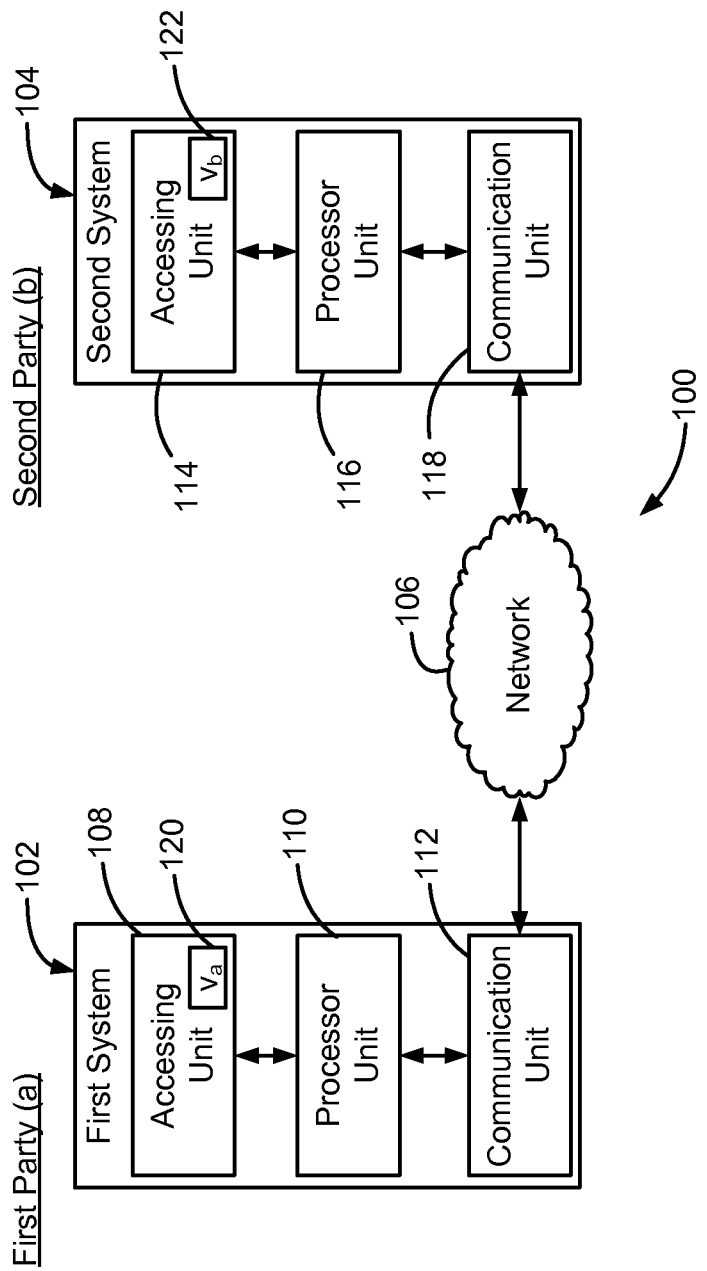
FIG. 1 is a schematic illustration of an exemplar system architecture in accordance with implementations of the present disclosure.

Referring now to FIG. 1, a schematic illustration of an exemplar system 100 is provided. The system 100 includes a first computing system 102, owned and/or operated by a first party, a second computing system 104, owned and/or operated by a second party, and a network 106. The network 106 can be provided as a large computer network, such as a local area network (LAN), wide area network (WAN), the Internet, a cellular network, or a combination thereof connecting any number of mobile clients, servers, and computing systems. The computing systems 102, 104 represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The first computing system 102 includes an accessing unit 108, a processor unit 110 and a communication unit 112. The second computing system 104 includes an accessing unit 114, a processor unit 116 and a communication unit 118. Lines between components of the first computing system 102 or the second system 104 generally represent interfaces configured to exchange data in both directions between the components.

In some implementations, the accessing units 108, 114 can each include volatile or non-volatile memory, such as random access memory (RAM), or read only memory (ROM) that store one or more private values associated with the first and second parties, respectively. In some implementations, the accessing unit 108, 114 can include a hard disc drive, a removable memory device (e.g., a removable universal system bus (USB) memory stick, a secure digital (SD) memory card, a compact disc (CD), a digital video disc (DVD), and/or other optical storage media), and/or a further, external computer system. The accessing unit 108 can store data associated with the first party, which data can include a private value ($v_a$)

120. The private value 120 is private, in that it is inaccessible by the second computing system 104 and/or any other, unauthorized computing system. The accessing unit 114 can store data associated with the second party, which data can include a private value ($v_b$) 122. The private value 122 is private, in that it is inaccessible by the second computing system 102 and/or any other, unauthorized computing system. The processor units 110, 116 can each include one or more processors that can access data stored in the accessing units 108, 114, respectively, and that can perform operations on the accessed data. The communication units 112, 118 each enable the respective computing systems 102, 104 to communicate with one another over the network 106.

As discussed in further detail herein, the first computing system 102 computes a contribution to a comparison of the first private value 120 and the second private value 122, and the second computing system 104 computes a contribution to the comparison. Each of the computing systems 102, 104 receives the other computing system's contribution and can independently execute the comparison.

Figure 2:
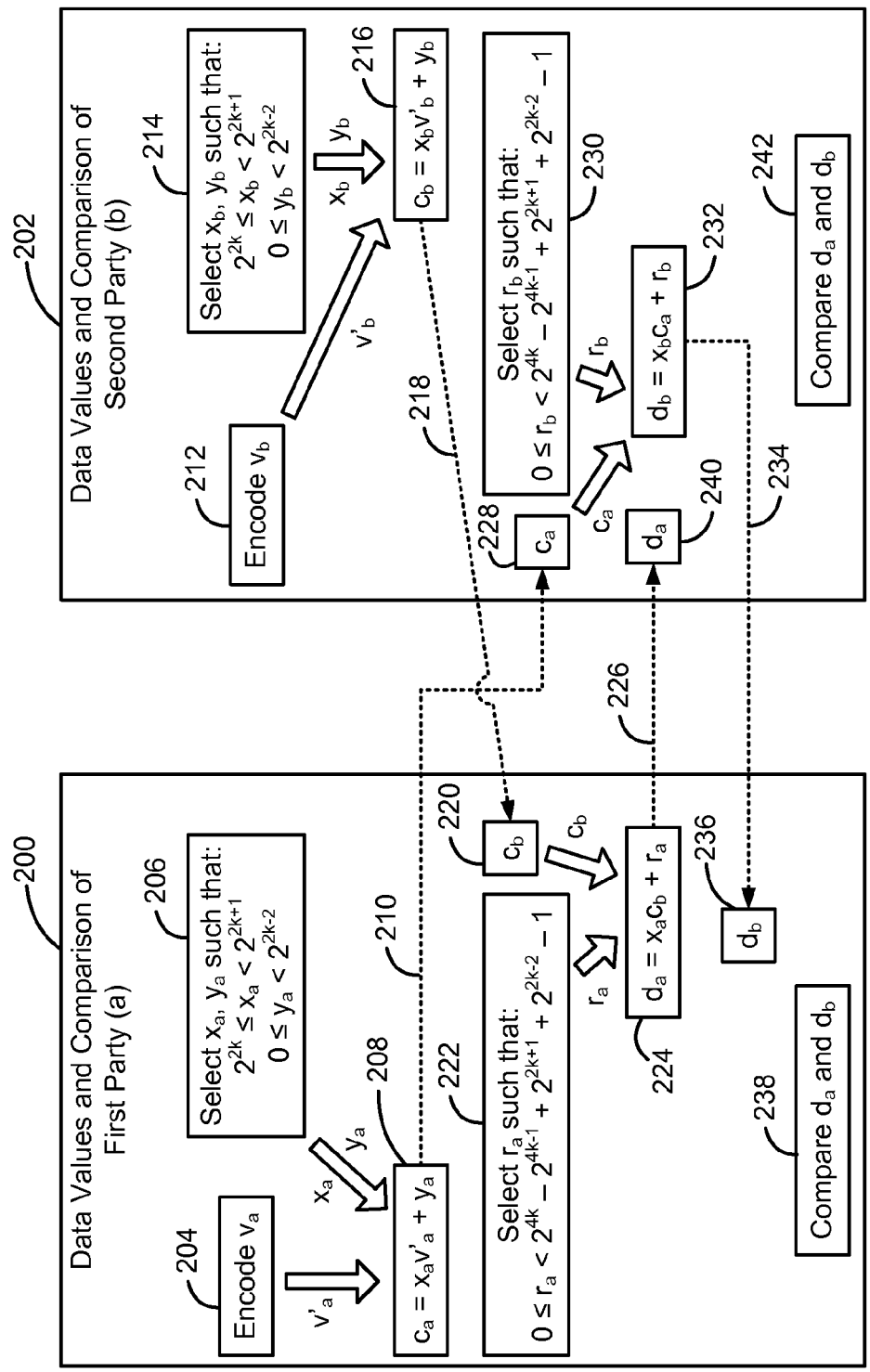
FIG. 2 is a block diagram illustrating an exemplar private value comparison between parties.

Referring now to FIG. 2, a block diagram illustrates an exemplar private value comparison between parties. Block 200 indicates data values and comparison determined and/or performed by a first party (a), and block 202 indicates data values and comparison determined and/or performed by a second party (b). A private value ($v_a$) is associated with the first party, and a private value ($v_b$) is associated with the second party. The first party encodes $v_a$ (204) by adding $2^{k-1}$ to provide $v'_a$, such that $v'_a$ has a fixed bit-length equal to k bits. For example, the processor unit 110 of the first computing system 102 can retrieve $v_a$ from the accessing unit 108, and can perform operations on $v_a$ to encode $v_a$ and generate $v'_a$. k is a fixed pre-agreed value, and is larger than the logarithm of the maximum value the first and second parties could want to compare. For example, if the first and second parties want to compare 32-bit numbers, then k=33.

For purposes of illustration, a non-limiting example includes k=9, and $v_a$=7, in decimal (0111, in binary). Because k=9, $v_a$ is encoded by adding 256 (100000000, in binary). As a result, $v'_a$ is generated and is equal 263 (100000111, in binary, and having a bit-length equal to 9).

The first party selects, or generates (206) random values $x_a$ and $y_a$, such that:

$$2^{2k} \leq x_a < 2^{2k+1}; \text{ and}$$

$$0 \leq y_a < 2^{2k-2}$$

For example, the processor unit 110 can select, or generate $x_a$ and $y_a$ based on k. In this manner, $x_a$ has a bit length of 2k, and $y_a$ has a maximum bit length of 2k−2. In some implementations, the random values $x_a$, $y_a$ can be pre-calculated and can be randomly selected from a list of pre-calculated, random values. In this manner, processing speed can be increased, because the random values do not need to be generated to effect the comparison. The first party calculates (208) an intermediate value $c_a$ based on the following formula:

$$C_a = x_a v'_a + y_a$$

For example, the processor unit 110 calculates $c_a$. The first party transmits (210) $c_a$ to the second party. For example, the communication unit 112 of the first computing system 102 can transmit $c_a$ to the second computing system 104 over the network 106. In some implementations, $c_a$ can be encrypted prior to transmission to the second party.

The second party encodes $v_b$ (212) by adding $2^{k-1}$ to provide $v'_b$, such that $v'_b$ has a fixed bit-length equal to k bits. For example, the processor unit 116 of the second computing system 104 can retrieve $v_b$ from the accessing unit 114, and can perform operations on $v_b$ to encode $v_b$ and generate $v'_b$. For purposes of illustration, the non-limiting example, above, includes k=9. Continuing with this example, suppose $v_b$=100, in decimal (1100100, in binary). Because k=9, $v_b$ is encoded by adding 256 (100000000, in binary). As a result, $v'_b$ is generated and is equal 356 (101100100, in binary, and having a bit-length equal to 9).

The second party selects, or generates (214) random values $x_b$ and $y_b$, such that:

$$2^{2k} \leq x_b < 2^{2k+1}; \text{ and}$$

$$0 \leq y_b < 2^{2k-2}$$

For example, the processor unit 116 can select, or generate $x_b$ and $y_b$ based on k. In this manner, $x_b$ has a bit length of 2k, and $y_b$ has a maximum bit length of 2k−2. In some implementations, the random values $x_b$, $y_b$ can be pre-calculated and can be randomly selected from a list of pre-calculated, random values. In this manner, processing speed can be increased, because the random values do not need to be generated to effect the comparison. The second party calculates (216) an intermediate value $c_b$ based on the following formula:

$$c_b = x_b v'_b + y_b$$

For example, the processor unit 116 calculates $c_b$. The second party transmits (218) $c_b$ to the first party. For example, the communication unit 118 of the second computing system 104 can transmit $c_b$ to the first computing system 102 over the network 106. In some implementations, $c_b$ can be encrypted prior to transmission to the first party.

The first party receives (220) $c_b$ from the second party. For example, the first computing system 102 receives $c_b$ from the second computing system 104 over the network 106. If $c_b$ was encrypted by the second party, the first party can decrypt $c_b$. The first party selects, or generates (222) a random number $r_a$, such that:

$$0 \leq r_a < 2^{4k} - 2^{4k-1} + 2^{2k+1} + 2^{2k-2} - 1$$

For example, the processor unit 110 selects, or generates $r_a$. In this manner, because the bit length is fixed to k bits, $r_a$ is fixed to a maximum bit length of 4k−1. In some implementations, the random number $r_a$ can be pre-calculated and can be randomly selected from a list of pre-calculated, random values. In this manner, processing speed can be increased, because the random number does not need to be generated to effect the comparison. The first party calculates (224) a comparison value $d_a$ based on the following formula:

$$d_a = x_a c_b + r_a$$

For example, the processor unit 110 calculates $d_a$. The first party transmits (226) $d_a$ to the second party. For example, the communication unit 112 of the first computing system 102 can transmit $d_a$ to the second computing system 104 over the network 106. In some implementations, $d_a$ can be encrypted prior to transmission to the second party.

The second party receives (228) $c_a$ from the first party. For example, the second computing system 104 receives $c_a$ from the first computing system 102 over the network 106. If $c_a$ was encrypted by the first party, the second party can decrypt $c_a$. The second party selects, or generates (230) a random number $r_b$, such that:

$$0 \leq r_b < 2^{4k} - 2^{4k-1} + 2^{2k+1} + 2^{2k-2} - 1$$

For example, the processor unit 116 selects, or generates $r_b$. In this manner, because the bit length is fixed to k bits, $r_b$ is fixed to a maximum bit length of 4k−1. In some implementations, the random number $r_b$ can be pre-calculated and can be randomly selected from a list of pre-calculated, random values. In this manner, processing speed can be increased, because the random number does not need to be generated to effect the comparison. The second party calculates (232) a comparison value $d_b$ based on the following formula:

$$d_b = x_b c_a + r_b$$

For example, the processor unit 116 calculates $d_b$. The second party transmits (234) $d_b$ to the first party. For example, the communication unit 118 of the second computing system 104 can transmit $d_b$ to the first computing system 102 over the network 106. In some implementations, $d_b$ can be encrypted prior to transmission to the first party.

The first party receives (236) $d_b$, and compares (238) $d_b$ to $d_a$. If $d_b$ was encrypted by the second party, the first party can decrypt $d_b$ prior to comparing. Similarly, the second party receives (240) $d_a$ and compares (242) $d_a$ to $d_b$. If $d_a$ was encrypted by the first party, the second party can decrypt $d_a$ prior to comparing. If $d_a$ is greater than $d_b$, then $v_b$ is greater than $v_a$. Otherwise, $v_a$ is greater than or equal to $v_b$. Neither the intermediate values $c_a$, $c_b$, nor the comparison values $d_a$, $d_b$, reveals the respective private value, or relative magnitudes of the private values. For example, although the comparison indicates whether $v_a$ or $v_b$ is greater than the other, how much greater one private value is over the other is indeterminable from the information provided to the parties.

Figure 3:
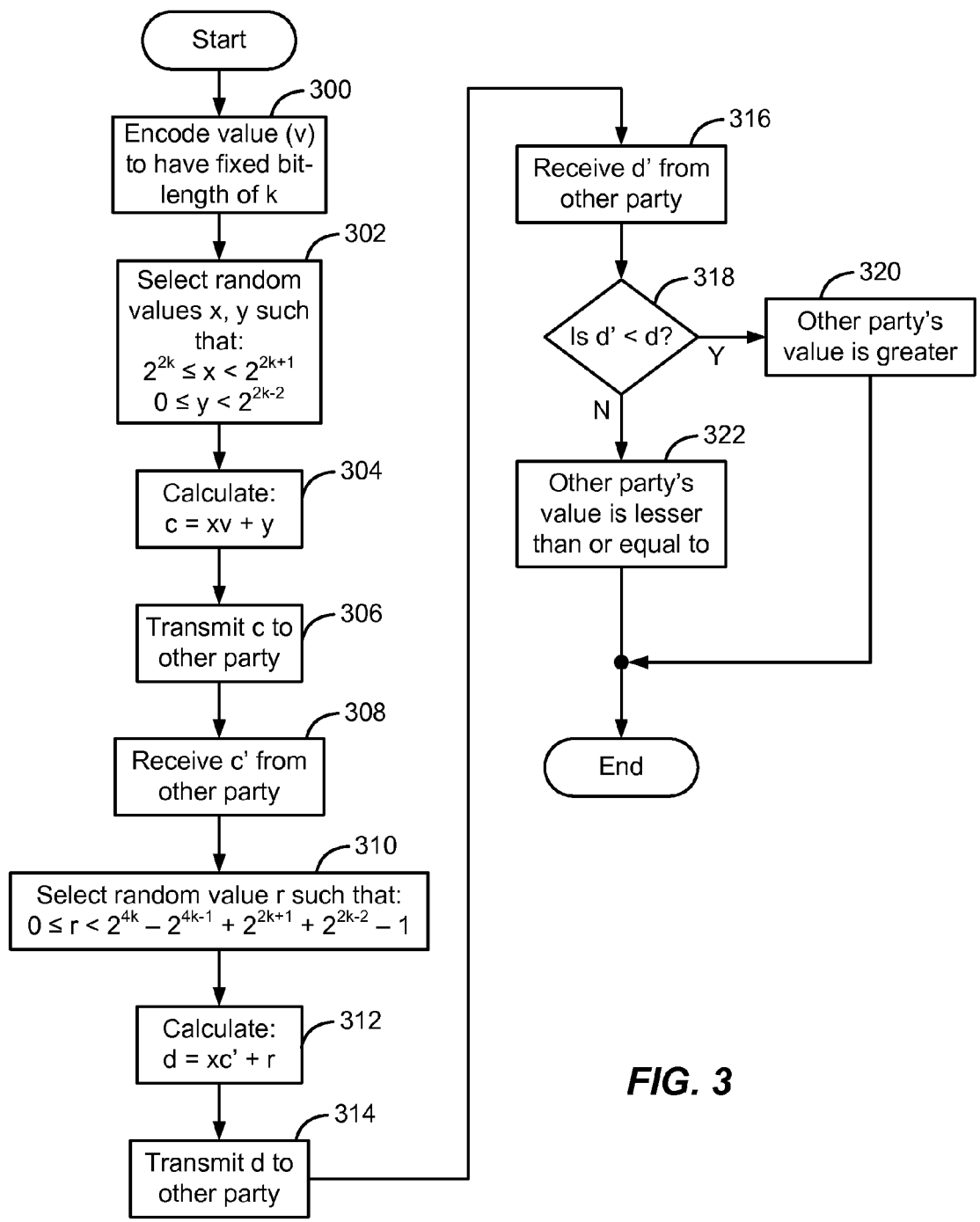
FIG. 3 is a flowchart illustrating exemplar steps that can be executed in implementations of the present disclosure.

Referring now to FIG. 3, exemplar steps that can be executed in accordance with implementations of the present disclosure will be described. In general, the exemplar steps are from the point of view of one of the parties, and illustrate the particular party's contribution to the comparison of the private values (v). It is appreciated that the exemplar steps of FIG. 3 are performed by both parties to generate each party's contribution to the comparison of the private values (v).

In step 300, the private value v is encoded to generate an encoded value v' having a fixed bit-length equal to k. For example, a processor unit can retrieve v from an accessing unit, and can perform operations on v to encode v and generate v'. In step 302, random values x and y are selected. For example, a processor unit can randomly generate, or select x and y. The intermediate value c is calculated in step 304. For example, a processor unit can calculate c based on v', x and y. In step 306, the intermediate value c is transmitted to the other party. For example, a processor unit can provide c to a communication unit, which transmits c to the other party over a network.

In step 308, the party receives an intermediate value c' generated by the other party. For example, a communications unit can receive c' from the other party over a network. For purposes of clarity, the intermediate value received from the other party is designated as c'. In step 310, a random value r is selected. For example, a processor unit generates, or selects r. In step 312, a comparison value d is calculated. For example, a processor unit calculates d based on x, c' and r. In step 314, the comparison value d is transmitted to the other party. For example, a processor unit can provide d to a communication unit, which transmits d to the other party over a network.

In step 316, the party receives a comparison value d' generated by the other party. For example, a communications unit can receive d' from the other party over a network. For purposes of clarity, the comparison value received from the other party is designated as d'. In step 318, it is determined whether d' is less than d. For example, a processor unit can compare d' to d. If d' is less than d, it is determined that the other party's private value is greater in step 320, and the steps end. If d' is not less than d, it is determined that the other party's value is less than or equal in step 322, and the steps end.

The systems and methods of the present disclosure provide a secure comparison of private values. That is, the private values of each of the first and second parties remain confidential, and neither the values themselves, their magnitudes, or their magnitude relative to one another are determinable from the intermediate value or comparison values that are transmitted between the first and second parties. Specifically, the security, or confidentiality of the private of the values is ensured using the randomly chosen summands, discussed above. Specifically, given two samples, the entropy of the random values remains at half the bit-length of the minimum random summand. This equals the entropy of the private value, such that no inferences as to the private values, magnitudes, and/or relative magnitudes is possible using either the intermediate values or the comparison values.

The systems and methods of the present disclosure drastically improve efficiency, because a significantly reduced number of calculations are required as compared to traditional solutions, and no modular operations, such as modular exponentiation, are used. For example, for 16-bit values, the next best, traditional solution requires approximately 60,000 multiplication calculations, whereas the solution presented herein implements only 4 multiplication calculations. Consequently, the systems and methods of the present disclosure are thousands of times faster than systems and methods implementing traditional solutions.

Figure 4:
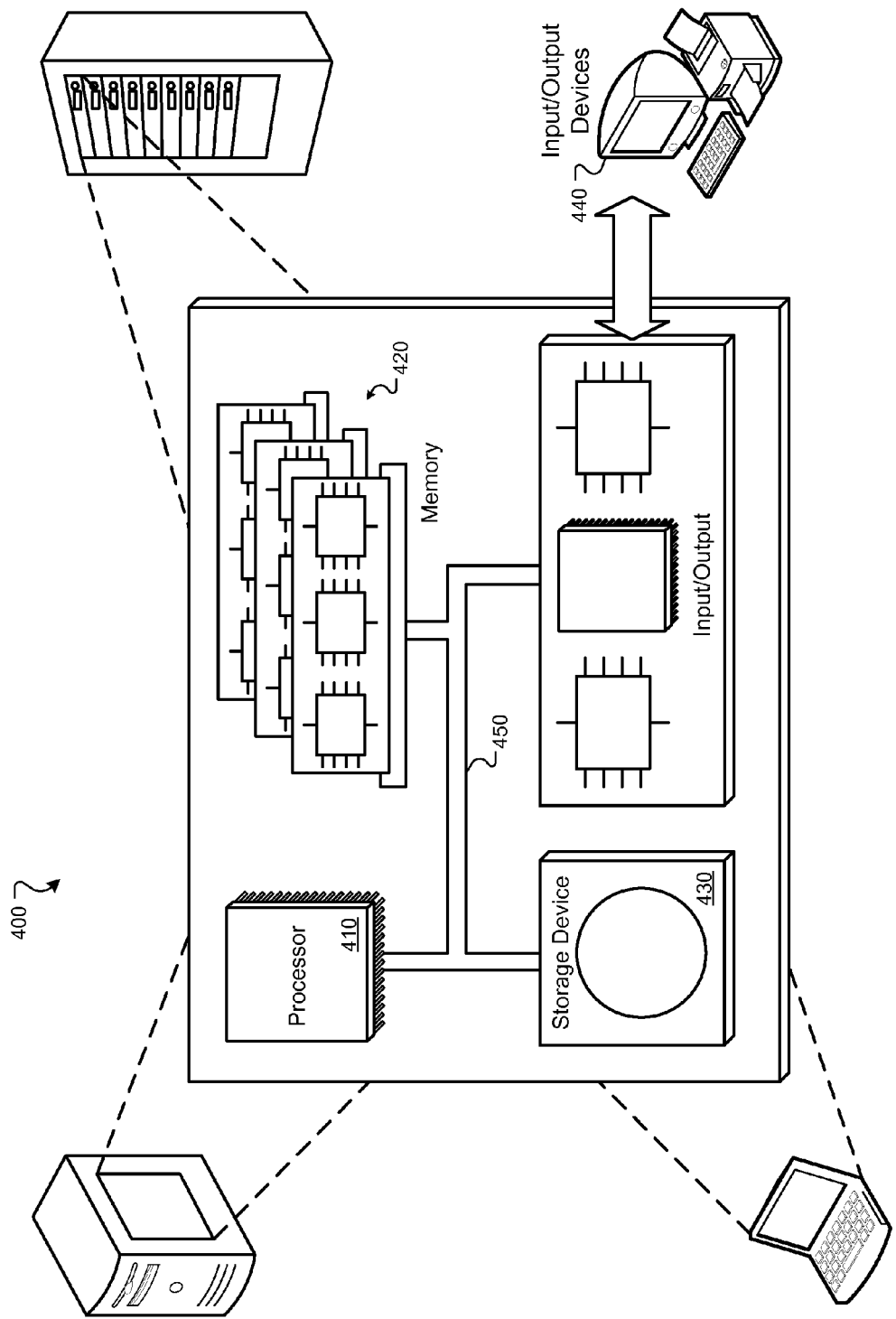
FIG. 4 is a schematic illustration of exemplar computer systems that can be used to execute implementations of the present disclosure.

Referring now to FIG. 4, a schematic diagram of an exemplar computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of comparing a first private value associated with a first party with a second private value associated with a second party, comprising:
    accessing the first private value from a non-transitory computer-readable storage medium;
    encoding the first private value to provide an encoded first private value;
    generating a first intermediate value based on the encoded first private value;
    sending the first intermediate value to a computing system associated with the second party over a network;
    receiving, at a computing system associated with the first party, from the computing system associated with the second party, a second intermediate value that is based on an encoded second private value, the encoded second private value being provided by encoding the second private value;
    generating a first comparison value based on the second intermediate value;
    receiving over the network a second comparison value that is based on the first intermediate value;
    comparing the first comparison value and the second comparison value to generate a result; and
    displaying the result on a display of a computing device, the result indicating that the first private value is greater than the second private value when the first comparison value is less than the second comparison value, and the result indicating that the first private value is less than or equal to the second private value when the first comparison value is greater than the second comparison value.

2. The method of claim 1, wherein generating the first intermediate value comprises:
    determining a first random value and a second random value; and
    calculating the first intermediate value as a function of the first encoded value, the first random value and the second random value, the first encoded value having a predetermined bit-length (k).

3. The method of claim 2, wherein the first comparison value is determined further based on the first random value.

4. The method of claim 1, wherein the second intermediate value is generated by:
    encoding the second private value to provide the second encoded value, the second encoded value having a predetermined bit-length (k);
    determining a first random value and a second random value; and
    calculating the second intermediate value as a function of the second encoded value, the first random value and the second random value.

5. The method of claim 4, wherein the second comparison value is determined further based on the first random value.

6. The method of claim 2 or claim 4, wherein:
    the first random value is determined such that the first random value has a bit-length that is equal to 2k; and
    the second random value is determined such that the second random value is greater than or equal to zero and has a maximum bit-length of 2k−2.

7. The method of claim 1, wherein generating the first comparison value comprises:
    determining a first random value and a second random value; and
    calculating the first comparison value as a function of the second intermediate value, the first random value and the second random value.

8. The method of claim 7, wherein the first intermediate value is determined further based on the first random value.

9. The method of claim 1, wherein the second comparison value is generated by:
    determining a first random value and a second random value; and
    calculating the second comparison value as a function of the first intermediate value, the first random value and the second random value.

10. The method of claim 9, wherein the second intermediate value is determined further based on the first random value.

11. The method of claim 7 or claim 9, wherein:
    the first random value is determined such that the first random value has a bit-length that is equal to 2k, where k is a predetermined bit-length; and
    the second random value is determined such that the second random value is greater than or equal to zero and has a maximum bit-length of 4k−1.

12. The method of claim 2, wherein at least one of the first and second random values is selected from a plurality of pre-calculated random values.

13. The method of claim 4, wherein at least one of the first and second random values is selected from a plurality of pre-calculated random values.

14. The method of claim 1, further comprising sending the first comparison value to the computing system associated with the second party over the network.

15. A non-transitory computer-readable storage medium coupled to one or more processors having instructions stored thereon which, when executed by the one or more processors, cause the one or more processors to perform operations to compare a first private value associated with a first party to a second private value associated with a second party, the operations comprising:
    accessing the first private value;
    encoding the first private value to provide an encoded first private value;
    generating a first intermediate value based on the encoded first private value;
    sending the first intermediate value to a computing system associated with the second party over a network;
    receiving a second intermediate value that is based on an encoded second private value, the encoded second private value being provided by encoding the second private value;
    generating a first comparison value based on the second intermediate value;
    receiving over the network a second comparison value that is based on the first intermediate value;
    comparing the first comparison value and the second comparison value to generate a result; and
    displaying the result on a display of a computing device, the result indicating that the first private value is greater than the second private value when the first comparison value is less than the second comparison value, and the result indicating that the first private value is less than or equal to the second private value when the first comparison value is greater than the second comparison value.

16. A system, comprising:

a display;

one or more processors and memory; and a non-transitory computer-readable storage medium coupled to the one or more processors having instructions stored thereon which, when executed by the one or more processors, cause the one or more processors to perform operations to compare a first private value associated with a first party to a second private value associated with a second party, the operations comprising:

accessing the first private value;

encoding the first private value to provide an encoded first private value;

generating a first intermediate value based on the encoded first private value;

sending the first intermediate value to a computing system associated with the second party over a network;

receiving, from a computing system associated with the second party over the network, a second intermediate value that is based on an encoded second private value, the encoded second private value being provided by encoding the second private value;

generating a first comparison value based on the second intermediate value;

receiving over the network a second comparison value that is based on the first intermediate value;

comparing the first comparison value and the second comparison value to generate a result; and displaying the result on the display, the result indicating that the first private value is greater than the second private value when the first comparison value is less than the second comparison value, and the result indicating that the first private value is less than or equal to the second private value when the first comparison value is greater than the second comparison value.

* * * * *